US006140291A

United States Patent [19]

Bolkan et al.

[11] Patent Number: 6,140,291

[45] **Date of Patent: *Oct. 31, 2000**

[54] GENERAL PURPOSE AQUEOUS CLEANER

[75] Inventors: Steven A. Bolkan, Hopewell; Gale A. Byrnes, Califon; Steven Dunn, Flemington; Alfredo Vinci, Dayton; Antony E. Winston, East Brunswick; Patricia L. Phillips, Somerville, all of N.J.

[73] Assignee: Church & Dwight Co., Inc., Princeton, N.J.

[ * ] Notice: This patent is subject to a terminal disclaimer.

[21] Appl. No.: 09/123,001

[22] Filed: Jul. 28, 1998

Related U.S. Application Data

[60] Division of application No. 08/708,323, Sep. 5, 1996, Pat. No. 5,834,411, which is a continuation-in-part of application No. 08/638,533, Apr. 26, 1996, abandoned, which is a continuation-in-part of application No. 08/311,268, Sep. 23, 1994, abandoned.

[51] Int. Cl.[7] ................................ C11D 9/04; C11D 3/22; C11D 14/02; C11D 17/08; C02F 5/02

[52] U.S. Cl. .......................... 510/245; 510/254; 510/175; 510/421; 510/422; 510/433; 510/481; 510/500; 510/509; 252/153; 252/173; 252/174.11; 252/547

[58] Field of Search .................................... 510/245, 254, 510/175, 421, 422, 433, 481, 500, 509; 252/153, 173, 174.11, 547

[56] References Cited

U.S. PATENT DOCUMENTS

| | | | |
|---|---|---|---|
| Re. 35,017 | 8/1995 | Winston et al. | 134/40 |
| 674,593 | 5/1901 | Bartelt | 95/32 |
| 2,037,566 | 4/1936 | Durgin et al. | 87/5 |
| 3,637,511 | 1/1972 | Yang | 252/527 |
| 3,959,166 | 5/1976 | Oberhofer et al. | 252/146 |
| 3,962,109 | 6/1976 | Oberhofer et al. | 252/146 |
| 4,089,720 | 5/1978 | Haley | 156/181 |
| 4,389,371 | 6/1983 | Wilson et al. | 422/15 |
| 4,426,309 | 1/1984 | Abel et al. | 252/75 |
| 4,540,442 | 9/1985 | Smith et al. | 134/2 |
| 4,620,936 | 11/1986 | Kielman et al. | 252/99 |
| 4,681,704 | 7/1987 | Bernardino et al. | 252/546 |
| 4,759,864 | 7/1988 | Van Neste et al. | 252/75 |
| 5,030,374 | 7/1991 | Tranner | 252/90 |
| 5,035,859 | 7/1991 | Gu et al. | 422/28 |
| 5,039,446 | 8/1991 | Estell | 252/174.12 |
| 5,075,026 | 12/1991 | Loth et al. | 252/122 |
| 5,076,954 | 12/1991 | Loth et al. | 252/122 |
| 5,093,031 | 3/1992 | Login et al. | 252/357 |
| 5,108,643 | 4/1992 | Loth et al. | 252/174.11 |
| 5,206,316 | 4/1993 | Chuang | 252/35 |
| 5,230,824 | 7/1993 | Carlson, Sr. et al. | 252/174.21 |
| 5,252,245 | 10/1993 | Garabedian, Jr. et al. | 252/153 |
| 5,264,047 | 11/1993 | Winston et al. | 134/42 |
| 5,269,962 | 12/1993 | Brodbeck et al. | 252/186.25 |
| 5,281,355 | 1/1994 | Tsaur et al. | 252/174.13 |
| 5,320,756 | 6/1994 | Winston | 210/667 |
| 5,328,685 | 7/1994 | Janchitraponvej et al. | 424/71 |
| 5,334,325 | 8/1994 | Chaussee | 252/174.16 |
| 5,409,639 | 4/1995 | Fusiak et al. | 252/542 |
| 5,425,894 | 6/1995 | Welch et al. | 252/174.21 |
| 5,614,027 | 3/1997 | Dunn et al. | 134/2 |
| 5,650,385 | 7/1997 | Dunn et al. | 510/245 |

FOREIGN PATENT DOCUMENTS

| | | |
|---|---|---|
| 782898 | 5/1955 | United Kingdom . |

*Primary Examiner*—Mukund J. Shah
*Assistant Examiner*—Tamthom N. Truong
*Attorney, Agent, or Firm*—Darby & Darby

[57] ABSTRACT

An aqueous metal cleaning composition is provided which comprises an alkalinity providing agent such as alkali metal carbonate and/or bicarbonate salts and a low foaming surfactant. The aqueous cleaning solution has specific foam height and foam collapse characteristics, and provides for substantially complete phase separation of a contaminant phase from the aqueous cleaning composition such that there is substantially no aqueous phase drag out into the contaminant phase; and the contaminant phase can be removed easily, and the aqueous cleaning solution can be recovered and reused.

21 Claims, 3 Drawing Sheets

GENERAL PURPOSE AQUEOUS CLEANER

The present application is a divisional application of Ser. No. 08/708,323 filed Sep. 5, 1996, now U.S. Pat. No. 5,834,411, which is a continuation-in-part application of abandoned application Ser. No. 08/638,533 filed Apr. 26, 1996, which is a continuation application of abandoned U.S. application Ser. No. 08/311,268 filed Sep. 23, 1994.

BACKGROUND OF THE INVENTION

The present invention relates generally to aqueous metal cleaning compositions. In particular, this invention is directed to aqueous metal cleaning compositions useful in so-called parts washers which are particularly adapted to be used for industrial cleaning, as well as for domestic use.

Parts washers of various kinds are known to those skilled in the art as having great utility for mechanics and others working in a variety of occupations, particularly those working in industrial plants, maintenance and repair services, and the like. The parts washers referred to herein include soak tanks, so-called hot tanks, immersion type parts cleaners with or without air agitation, spray washers (continuous or batch) and ultrasonic baths. Generally, parts washers are used to remove all types of contaminants adhered to the metal surface including greases, cutting fluids, drawing fluids, machine oils, antirust oils such as cosmoline, carbonaceous soils, sebaceous soils, particulate matter, waxes, paraffins, used motor oil, fuels, etc.

Until recently, metal surfaces were cleaned of most oily and greasy contamination by use of solvents. Existing solvents, with or without special additives, are adequate to achieve good cleaning of most dirty, greasy, metal parts. A great number of solvents have been employed to produce metallic surfaces free from contamination. These wash solvents generally include various halogenated hydrocarbons and non-halogenated hydrocarbons, of significant quantity industry wide for cleaning and degreasing of the metal surfaces, and the degree of success with each of these wash solvents is generally dependent upon the degree of cleanliness required of the resultant surface.

Recently, however, the various hydrocarbon and halogenated hydrocarbon metal cleaning solvents previously employed have come under scrutiny in view of the materials employed, and in particular, the environmental impact from the usage of the various materials. This is particularly so in the case of parts cleaning which is done in closed environments such as garages and the like or for even home usage in view of the close human contact. Even the addition of devices to parts washers which can, reduce spillage, fire and excessive volatilization of the cleaning solvent are not sufficient to alleviate present environmental concerns.

Although the halogenated hydrocarbon solvents such as chlorofluorocarbons (CFCs) and trichloromethane, methylene chloride and trichloroethane (methyl chloroform) are widely used in industry for metal cleaning, their safety, environmental and cost factors coupled with waste disposal problems are negative aspects in their usage. A world-wide and U.S. ban on most halogenated hydrocarbon solvents is soon in the offing by virtue of the Montreal Protocol, Clean Air Act and Executive and Departmental directives.

The non-halogenated hydrocarbon solvents such as toluene and Stoddard solvent and like organic compounds such as ketones and alcohols on the other hand are generally flammable, have high volatility and dubious ability to be recycled for continuous use. These, plus unfavorable safety, environmental and cost factors, put this group of solvents in a category which is unattractive for practical consideration. Most useful organic solvents are classified as volatile organic compounds (VOCs) which pollute the atmosphere, promote formation of toxic ozone at ground level, and add to the inventory of greenhouse gases.

In order to eliminate the various negative aspects of the known chemical washing and degreasing systems, it has, therefore, been suggested that an aqueous detergent system be used so as to overcome some of the inherent negative environmental and health aspects of prior art solvent cleaning systems. Unfortunately, aqueous cleaning systems are not without their own problems as related to use thereof in metal cleaning systems including use in parts washers as described above. For example, certain of the aqueous cleaners are exceedingly alkaline having pHs of 13 and above such as sodium hydroxide or include organic solvents such as alkanolamine, ethers, alcohols, glycols, ketones and the like. Besides being highly corrosive, the exceedingly high alkaline aqueous solutions are highly toxic and can be dangerous to handle requiring extreme safety measures to avoid contact with skin. Organic solvent-containing aqueous cleaners present the problems regarding toxicity, volatility or the environment as expressed previously. On the other hand, it is most difficult to obtain an aqueous detersive solution at moderate pH which is effective in removing the greases and oils which contaminate metal including metal engine parts and which would not be corrosive to the metal substrate.

One particular disadvantage of using aqueous systems to clean metal surfaces is the potential to corrode or discolor the surfaces. While aqueous cleaning solutions having a high pH such as formed from sodium hydroxide are often more corrosive than aqueous solutions having a moderate pH such as formed by mildly alkaline detergents, corrosion and discoloration are still problematic with the more moderate solutions.

Various corrosion inhibitors are known and have been used to prevent corrosion of metal surfaces which come into contact with aqueous alkaline solutions. This is because no one inhibitor, or combination of inhibitors, yet has provided protection for all metals and metal alloys. Examples of corrosion inhibitors include inorganic compounds such as alkali metal phosphates, borates, molybdates, arsenates, arsenites, nitrates, silicates, nitrites, and chromates, as well as various organic compounds such as mercaptobenzothiazole, benzotriazole, piperazine, ethylene diamine tetraacetic acid and the reaction product of phosphoric acid or boric acid and an alkanolamine.

Accordingly, to be as effective and be able to replace the halogenated and hydrocarbon solvents now widely used, aqueous metal cleaning compositions will have to be formulated to solve the problems associated therewith including efficacy of detersive action at moderate pH levels and the corrosiveness inherent in aqueous based systems, in particular, on metal substrates.

One particular problem with respect to corrosion using aqueous metal cleaning solutions is manifest in the cleaning of iron-based metals. Thus, it has been found that iron-based metals treated with aqueous based systems and then removed from the aqueous solution begin to rust almost immediately. This phenomenon has been characterized as flash rusting. Inasmuch as it takes longer for metal parts to dry subsequent to treatment with aqueous based cleaners as compared to the drying times of organic solvent-based cleaners due to the high surface tension of water, the potential for flash rusting to occur with iron-containing metal substrates is a serious drawback to the use of aqueous based cleaners to clean such metal surfaces.

It is also important that the aqueous metal cleaners be reusable to render such cleaners economically viable. Thus, it is not practical on an industrial scale to sewer an aqueous cleaning bath upon a single usage thereof. Many of the aqueous based cleaners now available use detersive agents which are effective in removing the dirt, grease or oil from the metal surface but unfortunately the contaminants are highly dispersed or solubilized throughout the aqueous solution. Such cleaning solutions are difficult to treat to separate contaminants from the aqueous cleaner and, accordingly, the cleaning solution gets spent in a relatively short period of time and must be replaced to again achieve effective cleaning of the metal parts and the like. It would be worthwhile to provide an aqueous metal cleaner which could effectively remove the contaminants from the metal surface and allow formation of a separate distinct and substantially complete contaminant phase from the cleaning solution phase to permit effective and prolonged reuse of the cleaning solution.

Still another disadvantage of the use of aqueous cleaners again stems from the high surface tension of water and the propensity of the detersive agents in the aqueous cleaner to foam upon agitation of the cleaning bath such as induced in the bath or by the use of spray nozzles to apply the cleaning solution to the metal components being cleaned. The presence of foam often renders the use of machines with high mechanical agitation impractical due to excessive foaming. Also, the presence of foam can cause pump cavitation problems and the overflow of liquids onto floors as well as cause difficulties with viewing the cleaning process through vision ports and the like contained in the machinery.

Accordingly, it is an object of this invention to provide an aqueous metal cleaning composition which is effective to clean grease, oil, dirt or any other contaminant from a metal surface and yet have a relatively moderate pH so as to not be excessively corrosive to the substrate and irritating to human skin.

Another object of the invention is to provide an aqueous metal cleaning composition which can be used effectively in immersion and impingement type parts washers so as to effectively remove dirt, grease, oil and other contaminants from metal parts and which is safe to use and not a hazard to the environment in use or upon disposal.

Still another object of the present invention is to provide an aqueous metal cleaning composition which is not corrosive to metal parts in general and, in particular, can greatly reduce flash rusting of iron-containing metal components.

Still yet another object of the present invention is to provide an aqueous metal cleaning composition of moderate pH which has effective detersive action and is low foaming to maintain the cleaning efficacy of the composition in aqueous solution.

A further object of the present invention is to provide an aqueous metal cleaning composition where contaminants removed from a metal surface form a phase separate from the aqueous phase containing the cleaning composition such that the contaminants can be separated from the aqueous cleaning solution and the solution continuously reused.

Yet another object of this invention is to provide an aqueous cleaning concentrate which when diluted to cleaning concentration can be an effective and environmentally sound aqueous cleaner.

These and other objects of the present invention can be readily ascertained from the description of the invention which follows.

SUMMARY OF THE INVENTION

In accordance with the present invention, an aqueous alkaline metal cleaning solution is provided which is low foaming, provides distinct phase separation between contaminants and the aqueous cleaning compositions for easy removal of contaminants, and effectively cleans dirt, grease, oil and the like from any metal surface. The aqueous metal cleaning solutions of the present invention are formed from compositions which contain an alkali metal salt having buffer capacity and one or more low foaming surfactants which do not solubilize the contaminants which are removed from the metal surface, thus allowing good phase separation between contaminants and aqueous cleaning solution. More importantly, there is substantially no aqueous phase drag out into the contaminant phase such that substantially all of the cleaning components of the aqueous cleaning solution are retained by the aqueous solution. Accordingly, such aqueous cleaning solutions of the present invention can be treated to separate the contaminants which have been removed from the metal substrates such as by skimming, filtration and the like to yield a cleaning solution which is essentially free from contamination and can be continuously reused to clean additional metal substrates. Unlike the halogenated or hydrocarbon solvents of the prior art, the aqueous alkaline cleaning solutions of this invention are environmentally safer in use and can be safely handled, stored and disposed of without the environmental problems caused by excessive amounts of volatile and toxic organics or the hazards of extremely high alkaline aqueous compositions which have been previously suggested. Additionally, the alkaline cleaning solutions of this invention have low amounts of phosphates, i.e., less than 3 wt. % of the cleaning compositions based on phosphorous, and effectively clean metal surfaces at moderate pH ranges of from 8.0 to about 12.0.

The metal cleaning compositions of this invention also optionally include a corrosion inhibitor. When silicate salts are employed as a corrosion inhibitor, a pH range of above 11.0 is preferred. A polycarboxylated polymer can be employed to maintain any corrosion inhibitor in solution in the moderate alkaline solutions of this invention, and a hydrotrope can be employed to maintain any surfactant in aqueous solution.

It has further been found that the treatment of iron-based metal surfaces with carbonates, bicarbonates or mixtures thereof is effective in greatly reducing, if not eliminating the phenomenon of flash rusting and, accordingly, the present invention is also concerned with a method of treating iron-based parts and surfaces with carbonate or bicarbonate salts or mixtures thereof either as part of the aqueous cleaning solution of this invention or in a post treatment step so as to prevent the flash rusting of the iron components and allowing such components to be stored without rusting until use.

DETAILED DESCRIPTION OF THE INVENTION

Figure 1:
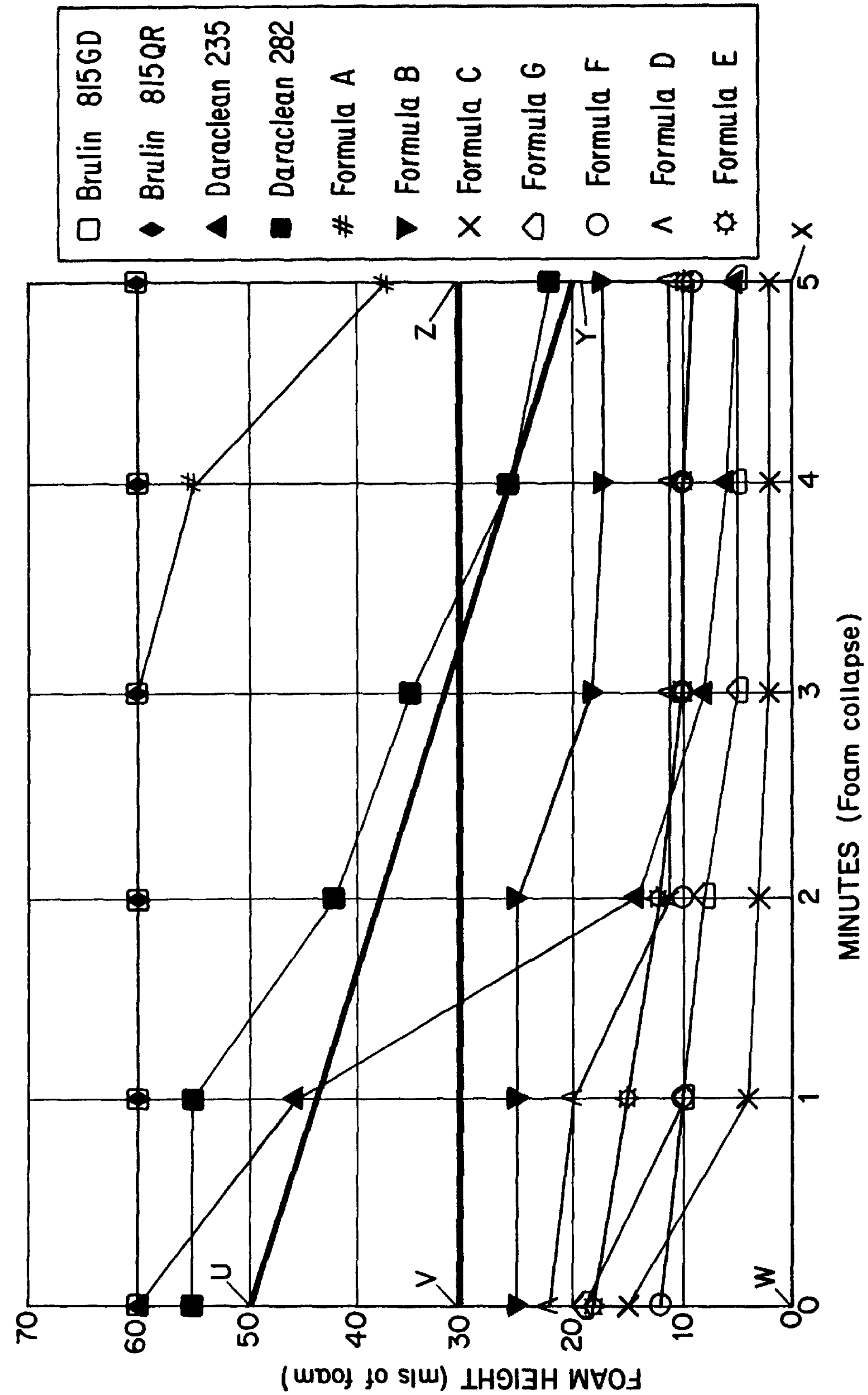
FIG. 1 is a graph comparing the foaming characteristics of the aqueous cleaners of the present invention with those of several commercially available metal cleaners.

Aqueous cleaning compositions of the present invention comprise an alkalinity providing agent which comprises an alkaline salt having a buffer capacity and a surfactant or mixture of surfactants which are low foaming and provide for distinct and substantially complete phase separation of contaminants from an aqueous cleaning solution with substantially no aqueous phase drag out into the contaminant phase. The metal cleaning compositions of the present invention are useful for removing any type of contaminant from a metal surface including greases, cutting fluids, drawing fluids, machine oils, antirust oils such as cosmoline, carbonaceous soils, sebaceous soils, particulate matter, waxes, paraffins, used motor oil, fuels, etc. Any metal surface can be cleaned including iron-based metals such as iron, iron alloys, e.g., steel, tin, aluminum, copper, tungsten, titanium, molybdenum, etc., for example. The structure of the metal surface to be cleaned can vary widely and is unlimited. Thus, the metal surface can be as a metal part of complex configuration, sheeting, coils, rolls, bars, rods, plates, disks, etc. Such metal components can be derived from any source including for home use, for industrial use such as from the aerospace industry, automotive industry, electronics industry, etc., wherein the metal surfaces have to be cleaned.

The aqueous alkaline metal cleaning solutions of this invention comprising the cleaning composition in water clean effectively at a pH of less than 11.0, but have a moderate pH range of from 8.0 to about 12.0. Such a pH range renders these solutions substantially less harmful to use and handle than highly alkaline aqueous cleaners such as those formed from sodium hydroxide or aqueous alkanolamine solutions. The solutions preferably have a pH of from 10.0 to less than 12.0 to effectively clean the typical metal substrates. Most preferably, the aqueous alkaline cleaning solutions have a pH from above 11.0 to less than 12.0 which is effective to remove the dirt, grease, oil and other contaminants from the metal surface without causing tarnishing or discoloration of the metal substrate and yet allow the solutions to be used, handled and disposed of without burning or irritating human skin. It is preferable that the compositions and resultant aqueous cleaning solutions formed therefrom be free of organic solvents including hydrocarbon, halohydrocarbon and oxygenated hydrocarbon solvents.

The alkalinity providing agent of the aqueous metal cleaning compositions of the present invention is provided to achieve the desired moderate pH in aqueous solution as well as to provide a sufficient reservoir of alkalinity to maintain the cleaning ability of the cleaning solution. Useful agents can be provided by one or more alkaline salts having a buffer capacity. Buffer capacity means the ability of a solution containing such agents to resist changes in pH upon addition of an acid or a base. Suitable alkaline salts or mixtures thereof useful in the present invention are those capable of providing the desired moderate pH and having a buffer capacity. Most suitable are the salts which appear to aid in the separation of the contaminants from aqueous solution. Preferred salts are those of potassium and sodium. Especially preferred are the potassium and sodium carbonates and bicarbonates which are economical, safe and environmentally friendly. The carbonate salts include potassium carbonate, potassium carbonate dihydrate, potassium carbonate trihydrate, sodium carbonate, sodium carbonate decahydrate, sodium carbonate heptahydrate, sodium carbonate monohydrate, sodium sesquicarbonate and the double salts and mixtures thereof. The bicarbonate salts include potassium bicarbonate and sodium bicarbonate and mixtures thereof. Mixtures of the carbonate and bicarbonate salts are also especially useful. When a pH of 11 or greater is desired, it is preferable not to employ bicarbonate salts but rather to employ carbonate salts to maintain a higher pH of the cleaning compositions.

The carbonate and bicarbonate salts are also especially useful inasmuch as it has been surprisingly found that treatment of iron-containing substrates with aqueous solutions of carbonate and/or bicarbonate salts greatly reduces the rusting of the substrates subsequent to when the substrates are removed from the aqueous cleaning solution and stand for either drying and/or storage. Thus, these preferred salts not only provide the desired moderate pH and alkalinity to the aqueous cleaning solution, but also provide a measure of corrosion protection to iron-based substrates. The carbonate and bicarbonate salts are preferably used in the cleaning solution but can also be used in a post treatment step such as a rinsing step which contains an aqueous solution of such salts to provide the resistance to flash rusting for the iron-based substrates. Such a post treatment step can use the potassium and sodium carbonate and bicarbonate salts described above but can also include ammonium salts.

Although not preferred, other suitable alkaline salts which can be used include the alkali metal ortho or complex phosphates. Examples of alkali metal orthophosphates include trisodium or tripotassium orthophosphate. The complex phosphates are especially effective because of their ability to chelate water hardness and heavy metal ions. The complex phosphates include, for example, sodium or potassium pyrophosphate, tripolyphosphate and hexametaphosphates. It is preferred to limit the amount of phosphates contained in the cleaners of this invention to less than 3 wt. % (based on phosphorous) relative to the total weight of the dry compositions inasmuch as phosphates are ecologically undesirable being a major cause of eutrophication of surface waters. Additional suitable alkaline salts useful in the metal cleaning compositions of this invention include the alkali metal borates, acetates, citrates, tartrates, succinates, silicates, edates, etc.

To improve cleaning efficacy of the cleaning compositions of the present invention, it is needed to add one or more surfactants. Nonionic surfactants are preferred as such surfactants are best able to remove the dirt, grease and oil from the metal substrates. Surfactants utilized in the cleaning compositions of the present invention most preferably are characterized as surfactants that permit contaminants removed from a metal surface by an aqueous solution of the present invention to form a substantially complete distinct and separate phase from the aqueous solution in the cleaning bath. Thus, the surfactants of this invention must be such as to penetrate the contaminants on the surface of the metal so as to remove same from the surface but at the same time the compositions of this invention in aqueous solution allow the formation of a substantially complete distinct and substantially complete separate contaminant phase so as to allow the separated contaminant phase to be easily removed from the cleaning solution such as by filtration, skimming and the like.

Substantially complete separation as defined herein means that at least 90%, preferably at least 95%, of the contaminants separate from the aqueous cleaning solution to form a substantially distinct contaminant phase with substantially no aqueous phase drag out into the contaminant phase. Such a property allows for reuse of the cleaning solution without continuous addition of components to replenish the cleaning solution. Contaminants such as dirt, grease, oil, etc. readily separate from the cleaning compositions of the present invention to form substantially distinct and separate contaminant and cleaning composition phases. Even oil contaminants having viscosities in the range of about 2 to about 10,000 cp or greater than 10,000 cp can be filtered or skimmed from the aqueous cleaning compositions of the present invention. Such oils can include light oils which have viscosities of about 2 to about 50 cp, medium oils which have viscosities of about 51 to about 800 cp and heavy oils which have viscosities of about 801 to about 10,000 cp. Thus, cleaning compositions of the present invention are meant to include any surfactant or combination thereof that readily permits substantial separation of the phase containing the dirt, grease, oil, etc., removed from the metal substrate, from the aqueous cleaning solution phase. Accordingly, any of such surfactants are to be considered within the scope of the present invention.

Preferably, it is believed that the alkoxylated nonionic surfactants which are devoid of phenolic compounds are best capable of improving the detersive action of the alkaline solution and provide for ready phase separation of contaminants from the aqueous cleaning solution phase. In general, ethoxylated alcohol, ethylene oxide-propylene oxide block copolymers, ethoxylated-propoxylated alcohols, alcohol alkoxylate phosphate esters, ethoxylated amines and alkoxylated thioethers are believed to be useful surfactants either alone or in combination in the cleaning compositions and solutions of the present invention.

Among the most useful surfactants in view of the ability thereof to remove grease and oil are the nonionic alkoxylated thiol surfactants. The nonionic alkoxylated (ethoxylated) thiol surfactants of the present invention are known and are described for example in U.S. Pat. Nos. 4,575,569 and 4,931,205, the contents of both of which are herein incorporated by reference. In particular, the ethoxylated thiol is prepared by the addition of ethylene oxide to an alkyl thiol of the formula R—SH wherein R is alkyl in the presence of either an acid or base catalyst. The thiol reactant that is suitable for producing the surfactant used in the practice of the present invention comprises, in the broad sense, one or more of the alkane thiols as have heretofore been recognized as suitable for alkoxylation by reaction with alkylene oxides in the presence of basic catalysts. Alkane thiols in the 6 to 30 carbon number range are particularly preferred reactants for the preparation of thiol alkoxylates for use as surface active agents, while those in the 7 to 20 carbon number range are considered more preferred and those in the 8 to 18 carbon number range most preferred.

Broadly, the thiol surfactant can be formed from reaction of the above alkyl thiol and one or more of the several alkylene oxides known for use in alkoxylation reactions with thiols and other compounds having active hydrogen atoms. Particularly preferred are the vicinal alkylene oxides having from 2 to 4 carbon atoms, including ethylene oxide, 1,2-propylene oxide, and the 1,2- and 2,3-butylene oxides. Mixtures of alkylene oxides are suitable in which case the product will be mixed thiol alkoxylate. Thiol alkoxylates prepared from ethylene or propylene oxides are recognized to have very advantageous surface active properties and for this reason there is a particular preference for a reactant consisting essentially of ethylene oxide which is considered most preferred for use in the invention.

The relative quantity of thiol and alkylene oxide reactants determine the average alkylene oxide number of the alkoxylate product. In the alkoxylated thiol surfactant of this invention, an adduct number in the range from about 3 to 20, particularly from about 3 to 15 is preferred. Accordingly, preference can be expressed in the practice of the invention for a molar ratio of alkylene oxide reactant to thiol reactant which is in the range from about 3 to 20, particularly from about 3 to 15. Especially preferred is an ethoxylated dodecyl mercaptan with about 6 ethylene oxide units. Such a surfactant is a commercial product known as ALCODET 260 marketed by Rhone-Poulenc.

Preferred examples of other alkoxylated surfactants include compounds formed by condensing ethylene oxide with a hydrophobic base formed by the condensation of propylene oxide with propylene glycol. The hydrophobic portion of the molecule which exhibits water insolubility has a molecular weight of from about 1,500 to 1,800. The addition of polyoxyethylene radicals to this hydrophobic portion tends to increase the water solubility of the molecule as a whole and the liquid character of the product is retained up to the point where polyoxyethylene content is about 50 percent of the total weight of the condensation product. Examples of such compositions are the "Pluronics" sold by BASF.

Other suitable surfactants include: those derived from the condensation of ethylene oxide with the product resulting from the reaction of propylene oxide and ethylene-diamine or from the product of the reaction of a fatty acid with sugar, starch or cellulose. For example, compounds containing from about 40 percent to about 80 percent polyoxyethylene by weight and having a molecular weight of from about 5,000 to about 11,000 resulting from the reaction of ethylene oxide groups with a hydrophobic base constituted of the reaction product of ethylene diamine and excess propylene oxide, and hydrophobic bases having a molecular weight of the order of 2,500 to 3,000 are satisfactory.

In addition, the condensation product of aliphatic alcohols having from 8 to 18 carbon atoms, in either straight chain or branched chain configuration, with ethylene oxide and propylene oxide, e.g., a coconut alcohol-ethylene oxide/propylene oxide condensate having from 1 to 30 moles of ethylene oxide per mole of coconut alcohol, and 1 to 30 moles of propylene oxide per mole of coconut alcohol, the coconut alcohol fraction having from 10 to 14 carbon atoms, may also be employed.

Also useful are alkoxylated alcohols which are sold under the tradename of "Polytergent SL-Series" surfactants by Olin Corporation or "Neodol" by Shell Chemical Co. Another effective surfactant which also provides antifoam properties is "Polytergent SLF-18" also manufactured by Olin.

Polyoxyethylene condensates of sorbitan fatty acids, alkanolamides, such as the monoalkoanolamides, dialkanolamides, and amines; and alcohol alkoxylate phosphate esters, such as the "Klearfac" series from BASF are also useful surfactants in the compositions of this invention.

The polyethylene oxide/polypropylene oxide condensates of alkyl phenols are believed to provide desirable phase separation between contaminant and cleaning solution, but are not effectively biodegradable to be particularly useful surfactants and in most cases should be avoided.

Other useful surfactants are those derived from N-alkyl pyrrolidone. This surfactant is one which can be used alone to achieve excellent cleaning or used in combination with the ethoxylated thiol surfactant. Particularly preferred is N-(n-alkyl)-2-pyrrolidone wherein the alkyl group contains 6–15 carbon atoms. These compounds are described in U.S. Pat. No. 5,093,031, assigned to ISP Investments, Inc., Wilmington, Del. and which discloses surface active lactams and is herein incorporated by reference. The above N-alkyl pyrrolidone products having a molecular weight of from about 180 to about 450 are conveniently prepared by several known processes including the reaction between a lactone having the formula:

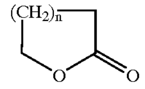

wherein n is an integer from 1 to 3, and an amine having the formula R'—$NH_2$ wherein R' is a linear alkyl group having 6 to 20 carbon atoms. The amine reactant having the formula R'—$NH_2$ includes alkylamines having from 6 to 20 carbon atoms; amines derived from natural products, such as coconut amines or tallow amines distilled cuts or hydrogenated derivatives of such fatty amines. Also, mixtures of amine reactants can be used in the process for preparing the pyrrolidone compounds. Generally, the $C_6$ to $C_{14}$ alkyl pyrrolidones have been found to display primarily surfactant properties.

It is also important that the surfactant or mixture of surfactants which are utilized are low foaming such that the aqueous cleaning solution formed from the aqueous compositions of the present invention are overall low foaming. It is also important that any foam which is formed swiftly collapses to about 0.5 ml to 0 ml within about one hour after forming. Preferably, the foam collapses to about 0.5 ml to 0 ml within about 20 minutes after the foam has formed. The present applicants have developed a foam test which is described in the examples which can be used to determine which compositions are useful in aqueous solution and can be characterized as low foaming. This test is easily performed with conventional equipment and can be utilized to form a foaming and foam collapse scale to characterize the cleaning solutions of the present invention. FIG. 1 sets forth in the area within points U, W, X, and Z the foaming characteristics of the useful cleaners of this invention. Preferably, the foaming characteristics fall within the points V, W, X and Y. In general, aqueous solutions containing up to about 20 wt. % of the composition of this invention have maximum foam height of about 25 ml and collapse to less than 20 ml, preferably, collapse to about 10 ml or less within 5 minutes according to the foaming and foam collapse test described in Example I below.

Additionally, the compostions of the present invention rapidly form a static blanket of foam of about 4 to about 3 ml in height after about 5 minutes which lasts about 60 minutes, or less, preferably about 20 minutes or less before the foam height collapses to about 0.5 ml or less.

The aqueous metal cleaning compositions of the present invention comprising the alkalinity providing agent and the surfactant or mixture of surfactants also preferably include other adjuvants such as corrosion inhibitors, polymeric stabilizing agents and hydrotropes to maintain the active ingredients of the composition in aqueous solution.

Useful anticorrosion inhibitors are silicate salts. When silicates are employed in aqueous cleaning compositions, especially for their anticorrosion activity on various metals such as aluminum and iron, it is preferable to maintain the pH of such cleaning compositions above 11.0 to about 12.0. Silicates used are those having the formula $M_2O$. $(SiO_2)_n$ where M represents an alkali metal and n is a number of from about 1.5 to about 4.5., preferably from about 1.6 to about 3.6, and most preferably from about 2.9 to about 3.3. Silicates preferably are used in the commercially available form known as liquid alkali metal silicates. One suitable liquid sodium silicate is commercially available from E. I. duPont de Nemours & Co., Wilmington, Del. under the trade designation "duPont's Grade F."

Particularly useful corrosion inhibitors which can be added to the aqueous metal cleaning compositions of this invention include magnesium and/or zinc ions. Preferably, the metal ions are provided in water soluble form. Examples of useful water soluble forms of magnesium and zinc ions are the water soluble salts thereof including the nitrates and sulfates of the respective metals. If the alkalinity providing agents are the alkali metal carbonates, bicarbonates or mixtures of such agents, magnesium oxide can be used to provide the Mg ion. The magnesium oxide is water soluble in such solutions and is a preferred source of Mg ions. The magnesium oxide appears to reduce coloration of the metal substrates even when compared with the chloride salt.

Another useful corrosion inhibitor added to metal cleaning compositions of this invention include a triazole compound in combination with an alkali metal borate. Triazoles which can be employed in compositions of this invention are any water-soluble 1,2,3-triazole such as 1,2,3-triazole itself having the formula:

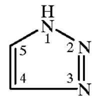

or an N-alkyl substituted 1,2,3-triazole, or a substituted water soluble 1,2,3-triazole where the substitution takes place in the 4- and/or 5-position of the triazole ring. Preferred 1,2,3-triazole is benzotriazole (sometimes known as 1,2,3-benzotriazole) having the structural formula:

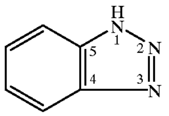

Other suitable water soluble derivatives include, for example, 4-phenyl-1,2,3-triazole; 1,2-naphthotriazole; 4-nitrobenzotriazole; 1,2,3-tolytriazole; 4-ethyl-1,2,3-triazole; 4-ethyl-1,2,3-triazole; 5-methyl-1,2,3-triazole; 5-ethyl-1,2,3-triazole; 5-propyl-1,2,3-triazole; 5-butyl-1,2,3-triazole; and the like.

Alkali metal borate components of the present invention can be any borax, alkali metal metaborate or alkali metal tetraborate compound; or mixtures thereof. Hydrated alkali metal tetraborate compounds are particularly preferred, with sodium tetraborate decahydrate and pentahydrate being the most preferred for use in the instant invention. The combination of a triazole and an alkali metal borate has anticorrosion activity on all metals, but is especially effective in inhibiting corrosion of copper and copper alloy metals.

In order to maintain the dispersibility of the magnesium and/or zinc corrosion inhibitors in aqueous solution, in particular, under the moderate alkaline pH conditions most useful in this invention and in the presence of agents which would otherwise cause precipitation of the zinc or magnesium ions, e.g., carbonates, phosphates, etc., it has been found advantageous to include a carboxylated polymer to the solution.

The carboxylated polymers may be generically categorized as water-soluble carboxylic acid polymers such as polyacrylic or polymethacrylic acids or vinyl addition polymers. Of the vinyl addition polymers contemplated, maleic anhydride copolymers as with vinyl acetate, styrene, ethylene, isobutylene, acrylic acid and vinyl ethers are examples.

All of the above-described polymers are water-soluble or at least colloidally dispersible in water. The molecular weight of these polymers may vary over a broad range although it is preferred to use polymers having average molecular weights ranging between about 1,000 up to less than 100,000. In a preferred embodiment of the invention these polymers have a molecular weight of about 10,000 or less and, most preferably, between about 1,000 to about 5,000. Advantageously, carboxylated polymers having the above molecular weight ranges, in particular molecular weights between 1,000 and about 5,000, maintain hardness ions in solution better than high molecular weight carboxylated polymers, i.e., greater than 100,000.

The water-soluble polymers of the type described above are often in the form of copolymers which are contemplated as being useful in the practice of this invention provided they contain at least 10% by weight of

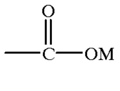

groups where M is hydrogen, alkali metal, ammonium or other water-solubilizing radicals. The polymers or copolymers may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

Especially useful maleic anhydride polymers are selected from the group consisting of homopolymers of maleic anhydride, and copolymers of maleic anhydride with vinyl acetate, styrene, ethylene, isobutylene, acrylic acid and vinyl ethers. These polymers can be easily prepared according to standard methods of polymerization.

The carboxylated polymers aid in maintaining the magnesium, silicate and zinc compounds in solution, thereby preventing the precipitation of the corrosion inhibitors from solution and consequent degradation of corrosion protection. Further, the carboxylated polymer aids in preventing water-hardness precipitation and scaling on the cleaning equipment surfaces when the cleaning compositions of this invention are used in hard water.

Such low molecular weight carboxylated polymers, molecular weight range from about 1,000 to less than 100,000, act as antinucleating agents to prevent carbonate from forming undesirable scaling in wash tanks. In particular, scaling occurs in heating elements in metal cleaning tanks, and cleaning such elements is especially difficult and time consuming.

The hydrotropes useful in this invention include the sodium, potassium, ammonium and alkanol ammonium salts of xylene, toluene, ethylbenzoate, isopropylbenzene, naphthalene, alkyl naphthalene sulfonates, phosphate esters of alkoxylated alkyl phenols, phosphate esters of alkoxylated alcohols and sodium, potassium and ammonium salts of the alkyl sarcosinates. The hydrotropes are useful in maintaining the organic materials including the surfactant readily dispersed in the aqueous cleaning solution and, in particular, in an aqueous concentrate which is an especially preferred form of packaging the compositions of the invention and allow the user of the compositions to accurately provide the desired amount of cleaning composition into the aqueous wash solution. A particularly preferred hydrotrope is one that does not foam. Among the most useful of such hydrotropes are those which comprise the alkali metal salts of intermediate chain length monocarboxylic fatty acids, i.e., $C_7$–$C_{13}$. Particularly preferred are the alkali metal octanoates and nonanoates.

The metal cleaning compositions of this invention comprise from about 20 to about 80 wt. % based on the dry components of the alkalinity providing agent, not less than 10 to about 50 wt. %, preferably, about 10 to about 30 wt. % of a surfactant, 0 to about 10 wt. %, preferably, about 0.5 to about 5 wt. % of a corrosion inhibitor compound, 0 to about 5 wt. %, preferably, about 0.3 to about 2 wt. % of a carboxylated polymer and 0 to about 30 wt. %, preferably, about 2 to about 25 wt. % of a hydrotrope. The dry composition is used in the aqueous wash solution in amounts of about 0.1 to about 20 wt. %., preferably, from about 0.2 to about 5 wt. % with the balance water.

Most preferably, the metal cleaning compositions of the present invention are provided and added to the wash bath as an aqueous concentrate in which the dry components of the composition comprise from about 5 to about 40 wt. % of the concentrate and, most preferably, from about 10 to about 20 wt. % with the balance water.

The aqueous concentrates of this invention preferably comprise about 60 to about 90% deionized water, about 5 to about 15 wt. % alkaline salts, and about 2 to about 10 wt. %, preferably about 3 to about 8 wt. %, surfactant, along with adjuvants comprising about 1 to about 5 wt. % of a hydrotrope, about 0.05 to about 5 wt. % of a corrosion inhibitor and about 0.05 to about 1 wt. % of any suitable polymeric dispersant.

Triazoles and alkali metal borates each are added to the compositions of the present invention in amounts of from about 0.5 to about 1.5 wt. % of the dry weight of the compositions. The weight ratio of triazole to alkali metal borate can range from about 2:1 to about 1:2. Preferably, the weight ratio is about 1:1.

Individually, magnesium, and silicate and zinc corrosion inhibitors can be added to the compositions in different amounts. Thus, the magnesium compound typically is added to dry composition in amounts of about 0.5 to about 5 wt. %, preferably from about 2 to about 4 wt. %, whereas an alkali metal silicate can be present in amounts of from about 0.5 to about 5 wt. % of a dry composition, preferably 1 to about 2 wt. % of a dry composition. Thus, useful levels of magnesium ion for producing an anticorrosive effect are between about 25 and 1,500 ppm with respect to the aqueous concentrate. It is preferable to use between about 50 and 200 ppm of magnesium in concentrates. It is to be understood that higher levels of magnesium ion can be included in aqueous concentrates, but for the most part, higher levels than that described are not believed to add significantly to the anticorrosive effect. Zinc, if added, can range from about 0.5 to about 2 wt. %.

The aqueous low foaming metal cleaning solutions of the present invention are useful in removing a variety of contaminants from metal substrates as previously described. A useful method of cleaning such metal parts is in a parts washer. In parts washers the metal parts are contacted with the aqueous solution either by immersion or some type of impingement in which the aqueous cleaning solution is circulated or continuously agitated against the metal part or is sprayed thereon. Alternatively, agitation can be provided as ultrasonic waves. The cleaning solution is then filtered and recycled for reuse in the parts washer.

For best use, the aqueous cleaning solutions of this invention preferably are at an elevated temperature typically ranging from about 90–180° F. The contact time of the aqueous cleaning solution with the metal substrates including metal engine parts will vary depending upon the degree of contamination but broadly will range between about 1 minute to 30 minutes with 3 minutes to 15 minutes being more typical.

EXAMPLE 1

In this example, the foaming characteristics of compositions within the scope of the present invention were compared with the foaming characteristics of a control composition and several commercial aqueous cleaners. The control and test samples (wt. %) are set forth in Tables 1 and 2 below. The commercial cleaners were Brulin 815 GD and QR™, phosphate-based cleaners containing a high level of surfactant and Daraclean 235™ and 282™ (W. R. Grace) which contain organic amines and/or glycol ether solvents.

TABLE 1

| | A (Control) | B | C |
|---|---|---|---|
| DI water | 82.475 | 82.475 | 82.475 |
| Sodium bicarbonate | 4.5 | 4.5 | 4.5 |
| Potassium carbonate | 3.0 | 3.0 | 3.0 |
| Sodium carbonate | 2.2 | 2.2 | 2.2 |
| Magnesium oxide | 0.075 | 0.075 | 0.075 |
| Acrylic acid polymer[1] | 0.25 | 0.25 | 0.25 |
| Sodium nanonoate | 3.0 | 3.0 | 3.0 |
| Ethoxylated thioether (Alcodet 260) | — | 1.0 | — |
| Ethoxylated-propoxylated alcohol (SL-92) | 3.0 | 1.0 | — |
| EO-PO-EO Block copolymer (L-61) | — | 1.0 | — |
| N-octyl pyrrolidone (LP-100) | 1.5 | 1.5 | 3.0 |
| Total | 100 | 100 | 100 |
| pH | 11.0 | 11.0 | 11.0 |

[1]A polycarboxylated copolymer containing acrylic and maleic acid units and having a molecular weight of about 4,500.

TABLE 2

| | D | E | F | G |
|---|---|---|---|---|
| Potassium carbonate | 8.00 | 3.00 | 5.00 | 0.00 |
| Potassium bicarbonate | 0.00 | 0.00 | 0.68 | 0.00 |
| Sodium carbonate | 0 | 0 | 0 | 5.5 |
| Sodium bicarbonate | 0.00 | 0.00 | 0.00 | 0.00 |
| 1,2,3-benzotriazole | 0.20 | 0.30 | 0.20 | 0.25 |
| Na tetraborate pentahydrate | 0.20 | 0.30 | 0.20 | 0.25 |
| Sodium tripolyphosphate | 2.00 | 2.00 | 0.00 | 0.00 |
| $MgSO_4$ | 0.00 | 0.00 | 0.50 | 0.00 |
| Alco 2310 | 0.50 | 0.50 | 0.50 | 2.50 |
| Monotrope 1250 | 8.00 | 8.00 | 8.60 | 7.50 |
| Industrol DW-5 | 1.50 | 1.00 | 2.00 | 0.00 |
| Plurafac LF 1200 | 1.00 | 1.25 | 1.00 | 0.00 |
| Plurafac LF 120 | 0.00 | 0.00 | 0.00 | 5 |
| ISP LP100 | 1.75 | 1.50 | 1.25 | 1.00 |
| Alcodet 260 | 0.50 | 1.00 | 1.00 | 0.00 |
| Olin SL-92 | 0.75 | 0.00 | 0.25 | 0.00 |
| Potassium silicate (40% active) | 1.90 | 1.50 | 0.00 | 0.00 |
| Potassium silicate | 0 | 0 | 0 | 1.8 |
| KOH (50% soln) | 0.90 | 1.10 | 0.00 | 0.00 |
| NaOH (50% soln) | 0.00 | 0.00 | 0.00 | 0.95 |

TABLE 2-continued

| | D | E | F | G |
|---|---|---|---|---|
| Distilled water | 72.80 | 78.55 | 78.82 | 75.25 |
| pH | 11.3 | 11.65 | 10.0 | 10.5 |

A foam test was devised which represents the agitation which would be found in a particular preferred method utilizing the solution in which the cleaning solution is in agitated contact with the metal substrates. The results of the foam testing are set forth in FIG. 1. The area within points U, W, X and Z, represents the desired foaming characteristics of aqueous cleaning compositions useful in the present invention when used in amounts of 0.5–20 wt. % in aqueous solution. The area between V, W, X and Y represents the preferred foaming characteristics of aqueous cleaning compositions of the present invention.

The foam and foam collapse test was as follows:

A 100 ml graduated cylinder was placed in a constant temperature water bath which contained a water level higher than the 40 ml mark on the graduated cylinder. The water bath was set to the desired temperature of about 100 degrees F.

In a 100 ml beaker, test solution was diluted (10×) with distilled water and placed on a Cole-Parmer stir/hot plate which contained a temperature probe. The temperature probe was immersed in the test solution and heated to the desired temperature of about 100 degrees F. Once the temperature had been reached, 40 ml of the test solution was placed in the 100 ml graduate cylinder heating in the water bath. The graduate was then capped and shaken vigorously for 30 seconds using an up and down hand motion.

Foam height was measured by reading the total milliliters of foam at time intervals of 0, 1, 2, 3, 4 and 5 minutes.

FIG. 1 discloses that the cleaners of the present invention designated as B, C, D, E, F and G had an initial foam height of about 25 ml or less at time 0 and less than 20 ml after about 5 minutes. After about 5 minutes, the compositions B, C, D, E and F formed a satic blanket of foam of about 4–3 ml in height for about 20 minutes before the foam height for each composition collapsed to below 0.5 ml. In contrast, composition A containing both alkaline salts and only an ethoxylated-propoxylated alcohol as a surfactant foamed too much with an initial foam height of about 60 ml. After 5 minutes, composition A had a foam height of about 38 ml exceeding the foam heights of the compositions of the present invention. Also the Brulin™ commercial cleaners showed substantially greater foaming than the compositions of the present invention with a foam height of about 60 ml lasting for over 5 minutes. The Daraclean 282™ and Daraclean 235™ cleaners had high initial foaming of about 55 ml and 60 ml, respectively, with Daraclean 235™ collapsing to a foam height of about 5 ml during the 5 minute time period. However, it is noted that the Daraclean™ cleaners contain glycol ether solvents which solubilize and disperse the dirt, grease or oil removed from treated substrates such that there is an incomplete separation of contaminant phase and cleaner phase and are, therefore, not as useful as the cleaners of the present invention.

Further, almost all the cleaners outside the scope of the compositions of the present invention formed static blankets of foam greater than 30 ml with the exception of the Daraclean compositions which formed static blankets below 30 ml. Daraclean 235™ formed a static blanket of about 5 ml at about 5 minutes and Daraclean 282™ formed static blanket of about 23 ml at about 5 minutes. However, all of the compositions outside the scope of the present invention had static blankets of foam which lasted several hours before the foam collapsed to less than 0.5 ml.

EXAMPLE 2

In this Example, aqueous cleaning formulations B and C of Example 1 were tested for cleaning ability and again compared with the cleaning ability of the two commercial cleaners Brulin 815 GD™ and Daraclean 235™ and control A of Example I.

The formulations A, B and C of Table 1 and the commercial cleaners received as concentrates were diluted (10×) with water and the solutions heated to 160° F.

A soil mix was made of ½ part used motor oil and ½ part axle grease and a small amount of carbon black. Approximately 1 gram of the mixed soil was applied to a metal mesh screen. The metal mesh screen was immersed in the heated cleaning solutions and periodically taken from these solutions and weighed to determine the amount of oil removal. The results are shown in FIG. 2 in which each of the data points represents the mean of three measurements.

Figure 2:
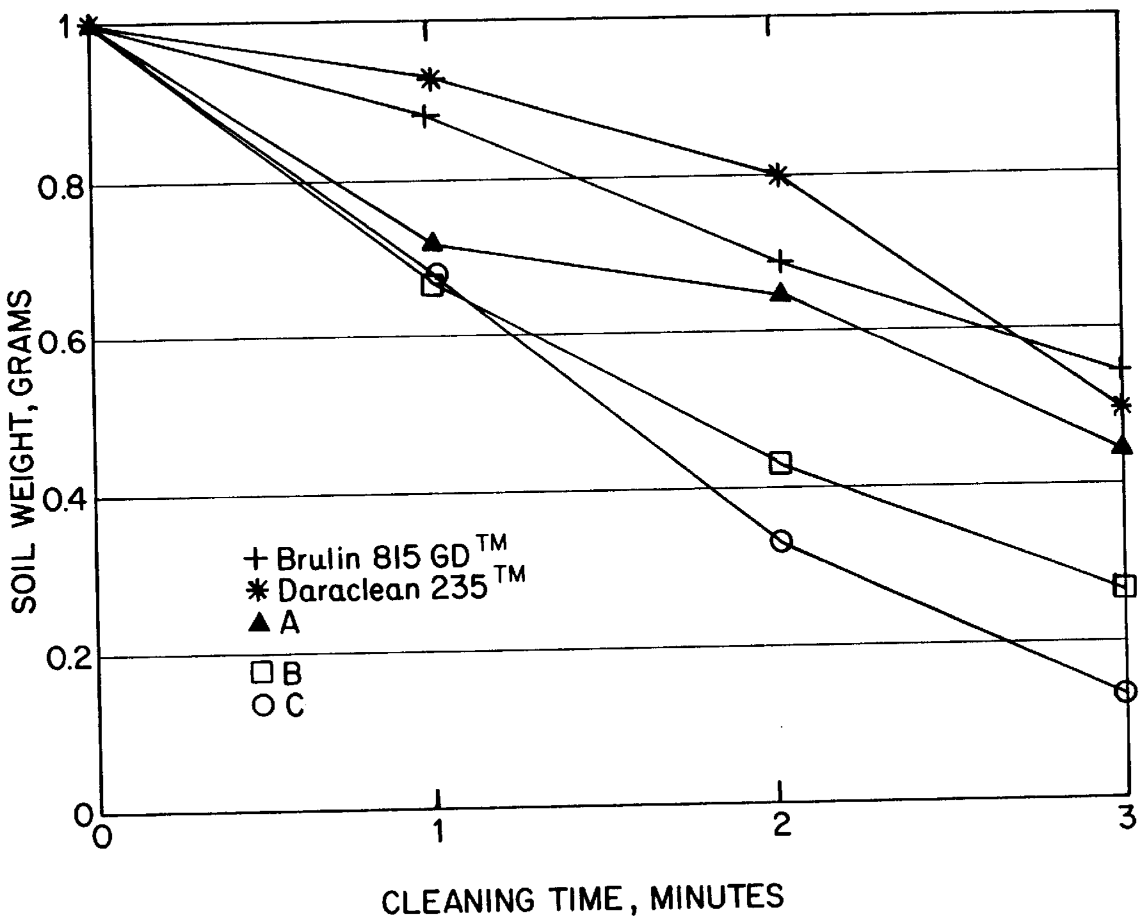
FIG. 2 is a graph comparing the cleaning efficacy of the aqueous cleaner of the present invention with that of commercially available metal cleaners.

As can be seen from FIG. 2, the aqueous cleaners of the present invention yielded substantially improved results after the two minutes of cleaning, compared with the control and the two commercial products.

EXAMPLE 3

In this Example, the Sample B which is set forth in Table 1 of Example 1 was tested to determine its ability to clean after repeated treatments to remove contaminants.

A soil mix was made of ½ part used motor oil and ½ part axle grease and a small amount of carbon black. Approximately 1 gram of the mixed soil was applied to a metal mesh screen. 100 ml of the concentrate (Sample B) was diluted (10×) to 1000 ml with tap water and heated to about 160° F. The metal mesh screen was immersed in the heated cleaning solution for approximately 3 to 4 min. and taken from the solution for weighing to determine the amount of soil removal. This was represented by the "initial oil removal" set forth in Table 2 below.

20 grams of 10W40 motor oil and 20 grams of the soil mix described above was added to the heated test solution. The amount of contaminants added to the solution represents approximately 4–6 weeks of heavy cleaning. The metal mesh was again immersed in the solution for 3–4 min., removed and weighed to determine the amount of oil removal. This represents the "final oil removal" as set forth in Table 3 below.

The solution was allowed to cool to room temperature and the top oil layer was removed. The solution was then filtered through a combination of Celite, PM-100™ and Polymin PR 8515™ (a BASF cationic polymer). The treated solution was then recorded for weight, pH, and conductance. Makeup solution was then added based on a 1⁄10 dilution with tap water to 1000 ml and heated to working temperature. The above represents one cleaning cycle. Four of such cleaning cycles were repeated and the results of cleaning are set forth in Table 3 below.

TABLE 3

| cycle # | Initial % oil removal | Final % oil removal | Solution Conductivity Mills-Siemans | pH |
|---|---|---|---|---|
| 1 | 99 | 50 | 12 | 9.4 |
| 2 | 93 | 42 | 13.6 | 9.3 |
| 3 | 90 | 39 | 18.2 | 9.3 |
| 4 | 97 | 35 | 20.3 | 9.3 |

The addition of the oil and soil mix to the cleaning solution for each cycle is meant to simulate approximately 4–6 weeks of cleaning. As can be seen, the solution was able to maintain its cleaning ability throughout the test.

EXAMPLE 4

In this example, the phase separation ability of various cleaning solutions were compared. All solutions were diluted (10×) in DI water. The following products were tested:

(H) Brulin 815 GD™, (I) Brulin 815 QR™, (J) invention cleaner (see Table 4), (K) Grace Daraclean 235™ and (L) Grace Daraclean 282™. The solutions were heated to 120° F. and 94 mls of liquid were drawn off and directed into a preheated 100 ml graduated cylinder. 6 mls of 10W40 Motor Oil were added to the cylinder and the cylinder capped. The capped cylinder was vigorously shaken for 30 seconds and allowed to stand. Mls. of the layers that formed at 3, 6, and 10 minutes were recorded. Results are shown in Table 5.

TABLE 4

SAMPLE J

| | wt % |
|---|---|
| Deionized water | 79.580 |
| Sodium bicarbonate | 4.480 |
| Potassium carbonate | 2.900 |
| Sodium carbonate | 2.220 |
| Magnesium oxide | 0.074 |
| Carboxylated Polymer[1] | 0.250 |
| Sodium nonanoate | 6.000 |
| Alcodet 260 | 3.000 |
| LP 100 | 1.500 |
| pH | 11.3 |

[1]Acrylic acid/Maleic anhydride copolymer having a molecular weight of about 4,500.

[1]Acrylic acid/Maleic anhydride copolymer having a molecular weight of about 4,500.

TABLE 5

| | Samples | | | | |
|---|---|---|---|---|---|
| | H | I | J | K | L |
| | Layer volume in mls | | | | |
| 3 min. | | | | | |
| Top | 7-cloudy | 3-cloudy | 7-cloudy | 3-cloudy | 4-cloudy |
| Bottom | 92 Foamy | 96 Foamy | 93 | 97 | 96 |
| 6 min. | | | | | |
| Top | 10-cloudy | 6-cloudy | 7-cloudy | 4-cloudy | 4-cloudy |
| Bottom | 90 Foamy | 93 Foamy | 93 | 96 | 96 |

TABLE 5-continued

| | Samples | | | | |
|---|---|---|---|---|---|
| | H | I | J | K | L |
| | Layer volume in mls | | | | |
| 10 min. | | | | | |
| Top | 10-cloudy | 10-cloudy | 7-cloudy | 4-cloudy | 6-cloudy |
| Bottom | 90 Foamy | Foamy | 93 | 96 | 94 |

The results show that 3 minutes after mixing 6 mls of Motor oil with present inventive Sample J, a 7 ml oily layer, which represents essentially all of the oil added, separates off. It may be noted that because of the increased oil volume over the amount added it appears that about 14% water remains trapped in the oil phase.

In contrast, 3 minutes after mixing with water solutions of either Brulin 815 QR™, Daraclean 235™ or Daraclean 282™, only about ½ of the oil separates off, the balance of the oil remaining emulsified in the water phase.

With Brulin 815 GD™, 7 mls of oil separates off after 3 minutes. However, an additional 3 mls of oil phase separates off after a further 3 minutes to a final volume of 10 mls. This indicates that the oil remains trapped in the water phase for a longer period than with the formula of the present invention. It also shows that once the oil does separate off, it contains about 3 times as much water emulsified in it as compared to the amount obtained with the inventive formulation. This will make the oil phase more difficult to treat, i.e., there will be a greater volume to dispose of as waste, or it will take more treatment to recover the pure oil from the oil phase if so desired.

EXAMPLE 5

In this example, the phase separation ability of various cleaning solutions are compared. All solutions are diluted (10×) in DI water. The following products are tested: (H) Brulin 815 GD™, (I) Brulin 815 QR™, (M and N) Armakleen® which is a cleaning composition of Church & Dwight (see Table 6), (K) Grace Daraclean 235™ and (L) Grace Daraclean 282™. The solutions are heated to 120° F. and 94 mls of liquid are drawn off and directed into a preheated 100 ml graduated cylinder. 6 mls of 10W40 Motor Oil are added to the cylinder and the cylinder capped. The capped cylinder is vigorously shaken for 30 seconds and allowed to stand. Mls. of the layers that form at 3, 6, and 10 minutes are recorded. Results are shown in Table 7.

TABLE 6

| | M wt. % | N wt. % |
|---|---|---|
| DI Water | 73.69 | 60.84 |
| Sodium Hydroxide-50% | 0.90 | 1.35 |
| Acrylic Acid Homopolymer | 0.90 | 0.90 |
| Potassium Carbonate | 7.81 | 7.81 |
| Potassium Silicate (Kasil #1)-29.1% | 3.75 | 16.50 |
| Sodium Carbonate Monohydrate | 6.90 | 6.90 |
| Sodium Bicarbonate | 0.35 | 0 |
| Sodium Alkanoate 50% Solution | 4.30 | 4.30 |
| Polytergent SL-42 | 0.35 | 0.35 |
| Polytergent S-405-LF | 0.15 | 0.15 |
| Polytergent SLF-18 | 0.40 | 0.40 |
| Polytergent CS-1 | 0.10 | 0.10 |
| LP-100 | 0.40 | 0.40 |
| pH | 11.3 | 11.6 |

TABLE 7

| | Samples | | | | | |
|---|---|---|---|---|---|---|
| | H | I | K | L | M | N |
| | Layer volume in mls | | | | | |
| 3 min. | | | | | | |
| Top | 7-cloudy | 3-cloudy | 3-cloudy | 4-cloudy | 4-cloudy | 8-cloudy |
| Bottom | 92 Foamy | 96 Foamy | 97 | 96 | 96 | 92 |
| 6 min. | | | | | | |
| Top | 10-cloudy | 6-cloudy | 4-cloudy | 4-cloudy | 5-cloudy | 9-cloudy |
| Bottom | 90 Foamy | 93 Foamy | 96 | 96 | 95 | 91 |
| 10 min. | | | | | | |
| Top | 10-cloudy | 10-cloudy | 4-cloudy | 6-cloudy | 6-cloudy | 9-cloudy |
| Bottom | 90 Foamy | Foamy | 96 | 94 | 94 | 91 |

The results show that 3 minutes after mixing with water solutions of either Brulin 815 QRT™, or Daraclean 235™, only about ½ of the oil separates off, the balance of the oil remaining mixes or is emulsified in the water phase.

With Brulin 815 GDT™, 7 mls of oil separates off after 3 minutes. However, an additional 3 mls of oil phase separates off after a further 3 minutes to a final volume of 10 mls. This indicates that more oil remains emulsified with the water phase than with formula M (Armakleen®). However, formula N, which is an alternate Armakleen® formula, shows more oil and water emulsified together than formula M. This will make the oil phase more difficult to treat, i.e., there will be a greater volume to dispose of as waste, or it will take more treatment to recover as waste, or it will take more treatment to recover the pure oil from the oil phase if so desired.

In contrast to the Armakleen® formulas M and N, formula J in Example 4, a composition within the scope of the present invention, shows improved phase separation properties. After only 3 minutes, substantially all the oil has separated from the water phase in formula J, and the oil and water phase remain separated over 10 minutes (see Table 5 sample J) such that the oil phase can be skimmed or filtered off and the water phase reused. In contrast after 3 minutes and 6 minutes, the oil still remains mixed with the water phase in compositions M an N (see Table 7). Moreover, even after 10 minutes oil remains mixed with the water phase in composition N. Such results are not surprising with respect to compositions M and N since such compositions emulsify contaminants such as oil.

AQUEOUS METAL CLEANER EXAMPLES 6 AND 7 AND CONTROLS 6 and 7

The following examples show the effectiveness of the combination of a triazole and an alkali metal borate in preventing corrosion and discoloration of iron-containing metal surfaces when exposed to alkaline solutions.

Steel test coupons A and B, each 5"×5" in size, are immersed for 72 and 96 hours, respectively, in aqueous solutions of the present invention (Examples 6 and 7) and two control solutions, not having the triazole compound and alkali metal borate combination, at 160° F. The coupons are recovered from the test solutions, thoroughly rinsed in distilled water and allowed to dry. Each coupon then is examined for signs of corrosion.

The test products as aqueous solutions and results of testing for each of the examples and controls are shown in Tables 8 and 9 (solutions) and Table 10 (results).

TABLE 8

| | Aqueous Metal Cleaner Examples (% Weight) | |
|---|---|---|
| | 6 | 7 |
| Water | 74.05 | 88.40 |
| Cobratec[1] | 0.200 | 0.200 |
| Sodium tetraborate pentahydrate | 0.200 | 0.200 |
| Sodium carbonate | 0.00 | 3.00 |
| Potassium carbonate | 8.00 | 0.00 |
| Sodium tripolyphosphate | 2.00 | 2.00 |
| Industrol Dw-5[2] | 0.25 | 0.00 |
| LF 1200[3] | 1.00 | 1.25 |
| Potassium silicate | 1.90 | 1.50 |
| Alcosperse 2310[4] | 0.50 | 0.50 |
| Monatrope 1250 | 8.00 | 0.00 |
| Alcodet 260 | 0.50 | 1.25 |
| ISP LP-100[5] | 1.75 | 1.00 |
| Olin SL 92 | 0.75 | 0.00 |
| Sodium hydroxide (50% sol.) | 0.00 | 0.70 |
| Potassium hydroxide (50% sol.) | 0.90 | 0.00 |

[1]1,2,3-benzotriazole.
[2]Low foaming, alcohol alkoxylate surfactant, BASF Corp.
[3]Low foaming alcohol alkoxylate, BASF Corp.
[4]Acrylic acid polymer, MW 2,500–4,500, Alco Chemical Corp., Chattanooga, TN.
[5]N-(n-octyl) 2 pyrrolidone, ISP.

TABLE 9

| | Controls (% Weight) | |
|---|---|---|
| | 6 | 7 |
| Water | 79.96 | 84.59 |
| Sodium hydroxide | 0.00 | 0.40 |
| Pot. bicarbonate | 10.00 | 0.00 |
| Potassium carbonate | 1.96 | 7.81 |
| Sodium tetraborate pentahydrate | 0.00 | 0.20 |
| Cobratec | 0.20 | 0.00 |
| $MgSO_4$ heptahydrate | 0.50 | 0.50 |
| Alco 2310 | 1.75 | 1.75 |
| Sodium tripolyphosphate | 0.00 | 0.45 |
| Potassium silicate | 0.00 | 1.00 |
| Alcodet 260 | 3.75 | 0.00 |
| ISP LP-100 | 1.88 | 2.00 |
| Olin SL-92 | 0.00 | 1.50 |

TABLE 10

| | | Visual appearance Steel Coupon Type | |
|---|---|---|---|
| | pH | A | B |
| Example 6 | 11.3 | No discoloration | No discoloration |
| Example 7 | 11.7 | No discoloration | No discoloration |
| Control 6 | 11.5 | brown | brown |
| Control 7 | 11.0 | brown | brown |

Referring to Table 10, the results show that the formulations of the present invention containing Cobratec and sodium tetraborate pentahydrate (Examples 6 and 7) are not corrosive to steel in contrast to the control formulations which did not contain Cobratec and sodium tetraborate pentahydrate. Each coupon, A and B, treated with control formulations shows brown deposits, i.e., rust. Further, the anticorrosion effects of Cobratec and sodium tetraborate pentahydrate are better than with silicates (Control 7). Thus, the combination of Cobratec (1,2,3-benzotriazole) and sodium tetraborate pentahydrate show improved anticorrosion activity on steel over cleaning compositions containing either sodium tetraborate pentahydrate or Cobratec alone.

AQUEOUS METAL CLEANER EXAMPLES 8 AND 9 AND CONTROLS 8 and 9

The following examples show the effectiveness of the combination of a triazole and an alkali metal borate in preventing corrosion and discoloration of brass metal surfaces when exposed to alkaline solutions.

Brass test coupons C and D, each 5"×5" in size, are immersed for 24 and 96 hours, respectively, in aqueous solutions of the present invention (Examples 8 and 9) and two control solutions, not having the triazole compound and alkali metal borate combination, at 140° F. The coupons are recovered from the test solutions, and visually examined for blemishes, spots or staining, i.e., corrosion.

The test products as aqueous solutions and results of testing for each of the examples and controls are shown in Tables 11 and 12 (solutions) and Table 13 (results).

TABLE 11

| Aqueous Metal Cleaner Examples (% Weight) | | |
|---|---|---|
| | 8 | 9 |
| Water | 74.05 | 71.68 |
| Cobratec | 0.200 | 0.200 |
| Sodium tetraborate pentahydrate | 0.200 | 0.200 |
| Sodium carbonate | 0.00 | 3.38 |
| Potassium carbonate | 8.00 | 4.40 |
| Sodium tripolyphosphate | 2.00 | 2.00 |
| Industrol Dw-5 | 0.25 | 0.00 |
| LF 1200 | 1.00 | 1.25 |
| $MgSO_4$ heptahydrate | 0.00 | 0.00 |
| Potassium silicate | 1.90 | 1.50 |
| Alcosperse 2310 | 0.50 | 0.50 |
| Monatrope 1250 | 8.00 | 8.00 |
| Alcodet 260 | 0.50 | 1.00 |
| ISP LP-100 | 1.75 | 1.50 |
| Genapol 2222 | 0.00 | 1.00 |
| Olin SL 92 | 0.75 | 1.00 |
| Sodium bicarbonate | 0.00 | 2.64 |
| Potassium hydroxide (50% sol.) | 0.90 | 0.00 |
| Alcogum SI.70 | 0.00 | 0.50 |

TABLE 12

| | Controls (% Weight) | |
|---|---|---|
| | 8 | 9 |
| Water | 74.25 | 81.05 |
| Potassium hydroxide (50% sol.) | 0.90 | 0.75 |
| LF 1200 | 1.00 | 1.25 |
| Potassium carbonate | 8.00 | 3.00 |
| Sodium tetraborate pentahydrate | 0.20 | 0.20 |
| Monotrope 1250 | 8.00 | 8.00 |
| Industrol DW-5 | 0.25 | 0.25 |
| Alco 2310 | 0.50 | 0.50 |
| Sodium tripolyphosphate | 2.00 | 2.00 |
| Potassium silicate | 1.90 | 1.50 |
| Alcodet 260 | 0.50 | 1.00 |
| ISP LP-10 | 1.75 | 1.00 |
| Olin SL-92 | 0.75 | 0.00 |
| Cobratec | 0.00 | 0.00 |

TABLE 13

| | | Visual appearance Steel Coupon Type | |
|---|---|---|---|
| | pH | C | D |
| Example 8 | 11.3 | No discoloration | No discoloration |
| Example 9 | 10.0 | No discoloration | No discoloration |
| Control 8 | 11.3 | No discoloration | spotty |
| Control 9 | 11.5 | No discoloration | spotty |

Referring to Table 13, the results show that the formulations of the present invention containing Cobratec and sodium tetraborate pentahydrate (Examples 8 and 9) are not corrosive to brass. In contrast, Coupon D held in the test solutions for 96 hours treated with control formulations shows spotty deposits, i.e., corrosion. Thus, the combination of Cobratec (1,2,3-benzotriazole) and sodium tetraborate pentahydrate show improved anticorrosion activity on brass over cleaning compositions not containing sodium tetraborate pentahydrate and Cobratec in combination for longer time periods.

EXAMPLE 10

In this example, phase separation of oil from a cleaning formula of the present invention, the components of which are listed in Table 14, was contrasted with phase separation of oil from Brulin 815GD™ and Daraclean 235™. Each cleaning solution was diluted (10×) in DI water. Three samples of each solution were heated to 120 degrees F. and three 94 ml samples of each solution were drawn off and directed into separate preheated 100 ml graduated cylinders. Each 100 ml graduate received 6 ml of one of the following oils: 10W40 motor oil, cutting oil and 3 in 1 oil, having viscosity ranges of heavy (801–10,000 cp), medium (51–800 cp) and light (2–50 cp) at 25 degrees C., respectively. Each cylinder was capped and vigorously shaken for 30 seconds, allowed to stand, and the volume of the oil layers that formed at 3, 6, 10 and 15 minutes were recorded, and the percentage of oil in each oil layer at each time period was determined. Results are disclosed in Table 15.

TABLE 14

| Aqueous Metal Cleaner (% Weight) | |
|---|---|
| Water | 74.05 |
| Cobratec[1] | 0.200 |
| Sodium tetraborate pentahydrate | 0.200 |
| Sodium carbonate | 0.00 |
| Potassium carbonate | 8.00 |
| Sodium tripolyphosphate | 2.00 |
| Industrol Dw-5[2] | 0.25 |
| LF 1200[3] | 1.00 |
| Potassium silicate | 1.90 |
| Alcosperse 2310[4] | 0.50 |
| Monatrope 1250 | 8.00 |
| Alcodet 260 | 0.50 |
| ISP LP-100[5] | 1.75 |
| Olin SL 92 | 0.75 |
| Sodium hydroxide (50% sol.) | 0.00 |
| Potassium hydroxide (50% sol.) | 0.90 |
| pH | 11.3 |

[1]1,2,3-benzotriazole.
[2]Low foaming, alcohol alkoxylate surfactant, BASF Corp.
[3]Low foaming alcohol alkoxylate, BASF Corp.
[4]Acrylic acid polymer, MW 2,500–4,500, Alco Chemical Corp., Chattanooga, TN.
[5]N-(n-octyl) 2 pyrrolidone.

TABLE 15

OIL BREAK-OUT DATA

| | | % OIL IN OIl PHASE TIME (minutes) | | | |
|---|---|---|---|---|---|
| PRODUCT | OIL TYPE | 3 | 6 | 10 | 15 |
| C & D FORMULA | MOTOR OIL | 50 | 66.7 | 83.3 | 100 |
| | CUTTING OIL | 66.7 | 83.3 | 100 | 100 |
| | 3 IN 1 OIL | 66.7 | 100 | 100 | 100 |
| BRULIN 815 GD ™ | MOTOR OIL | 66.7 | 100 | 133.3 | 150 |
| | CUTTING OIL | 66.7 | 100 | 133.3 | 150 |
| | 3 IN 1 OIL | 66.7 | 116.7 | 133.3 | 150 |
| DARACLEAN 235 ™ | MOTOR OIL | 250 | 283.3 | 283.3 | 283.3 |
| | CUTTING OIL | 33.3 | 100 | 100 | 100 |
| | 3 IN 1 OIL | 33.3 | 83.3 | 116.7 | 116.7 |

The results disclosed in Table 15 show that after 6 minutes 100% of the 3 in 1 oil separated from and formed a distinct oil phase from the cleaning solution of the present invention. After 10 minutes, 100% of the heavier cutting oil separated and formed a distinct oil phase from the aqueous cleaning solution. After 15 minutes, 100% of the heavy motor oil completely separated from the aqueous cleaning solution of the present invention. Further, the oil phases formed in the cylinders with the 3 in 1 oil and the cutting oil remained separate and distinct from the aqueous cleaning solution phase such that each oil phase was skimmed from the cylinder and the aqueous cleaning solution capable of being reused.

In contrast, the oil phases of the cylinders containing the Brulin 815GD™ and the Daraclean 235™ have remixed with the cleaning solution phase after a period of 15 minutes, with the exception of the Daraclean 235™/cutting oil combination, such that removal of the oil from the cleaning compositions requires complex separation methods such as chromatography and distillation. Thus, the ready phase separation of oil from aqueous cleaning compositions of the present invention provide for an effective and efficient means for removing oil from the aqueous cleaning solutions such that the cleaning solutions can be reused.

EXAMPLE 11

Figure 3:
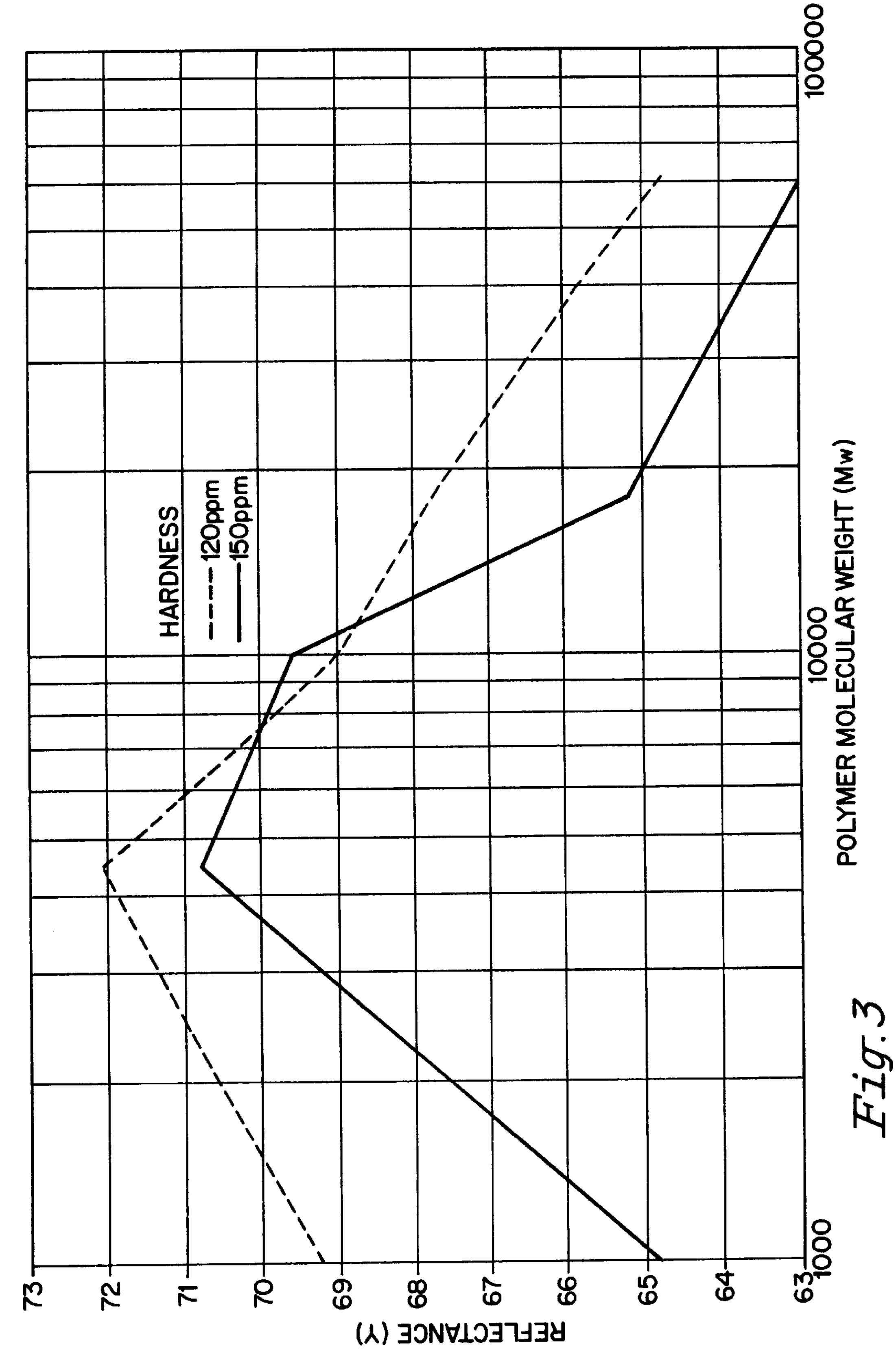
FIG. 3 is a graph contrasting water hardness ion solubility with low and high molecular weight acrylic polymers.

The following example is directed to the graph shown in FIG. 3 which contrasts the ability of acrylic polymers having different molecular weights to keep hardness ions, i.e., calcium and magnesium ions, in solution to help prevent the problem of hardness deposits, known as scaling, from forming along the sides of cleaning tanks, and also to form complexes with carbonate and phosphate ions to prevent precipitation of anticorrosion ions such as zinc or magnesium ions.

Five acrylic polymers each having a different molecular weight were mixed with an aqueous solution having calcium carbonate at a concentration of about 120 ppm and a solution having calcium carbonate in a concentration of about 150 ppm. 10 mg of each polymer was mixed with about 100 ml of each type of aqueous solution at room temperature. Each sample was warmed to a temperature of about 40 degrees C. and a 5 ml sample from each test tube was placed in a UV light spectrophotometer and the reflectance of the particles of each sample was recorded and plotted on a graph of reflectance verses acrylic acid polymer molecular weight. The higher the reflectance value, or the more UV light reflected by the water soluble particles, the more calcium carbonate a polymer complexes with to form a water soluble polymer-calcium carbonate complex. The lower the reflectance value the less UV light reflected and the more UV light absorbed by the chemical bonds of the insoluble acrylic polymer molecules.

The test samples having acrylic polymers having a molecular weight of about 4500 and 100,000 are clear solutions with reflectance values of about 70.8 and 69.7, respectively, in aqueous solutions having a calcium carbonate concentration of about 150 ppm, and reflectance values of about 72 and 69, respectively, in aqueous solutions having a calcium carbonate concentration of about 120 ppm. In contrast, solutions with acrylic polymers having a molecular weight of over 100,000 are turbid and have reflectance values of 65.2 and 63.0 for the solutions having a calcium carbonate concentration of about 150 ppm, and about 67.6 and 64.9 in solutions having a calcium carbonate concentration of about 120 ppm. Thus, acrylic polymers having a molecular weight of about 4500 show the best complexing and dissolution properties for hardness salts such as calcium carbonate, while acrylic polymers exceeding 100,000 are least effective.

What is claimed is:

1. A method of cleaning metal substrates so as to remove contaminants therefrom comprising:

contacting said metal substrates with an aqueous cleaning solution comprising about 0.1–20 wt. % of an organic solvent-free cleaning composition containing at least one alkaline salt and a surfactant, said solution being characterized as having a phosphate content of less than 3 wt. % of the composition based on phosphorous, having complete phase separation ability whereby contaminants form a distinct and substantially complete phase from the aqueous solution, and having an initial foam height within the area bounded by points U, W, X and Z of FIG. 1, said contacting being for a sufficient time to remove said contaminants from said substrate and removing said substrate from said solution.

2. The method of claim 1, wherein the initial foam height within the area is bounded by points V, W, X and Y of FIG. 1.

3. The method of claim 1, wherein the surfactant comprises from 10 wt. % to about 50 wt. % of the composition.

4. The method of claim 1, wherein said solution has a pH of from 8.0 to about 12.0.

5. The method of claim 4, wherein said solution has a pH of above 11.0 to less than 12.0.

6. The method of claim 1, wherein said alkaline salts comprise alkali metal carbonates, alkali metal bicarbonates and mixtures thereof.

7. The method of claim 1, wherein said surfactant comprises a non-phenolic alkoxylated nonionic surfactant comprising an ethoxylated or ethoxylated-propoxylated compound.

8. The method of claim 1, wherein said metal substrates are contacted with said cleaning solution by immersion, impingement or both.

9. The method of claim 1, wherein said metal substrates are sprayed with said aqueous cleaning solution.

10. The method of claim 1, wherein said aqueous cleaning solution is at a temperature of from about 90–180° F.

11. The method of claim 1, wherein after said substrates are removed from said cleaning solution, said cleaning solution is treated by separating the distinct and substantially complete contaminant phase from said aqueous phase and said aqueous phase is reused to clean additional metal substrates.

12. The method of claim 11, wherein said aqueous solution is treated to remove said contaminants by filtering said aqueous cleaning solution or by skimming said contaminants from said aqueous cleaning solution.

13. The method of claim 1, wherein said composition further comprises an anticorrosion agent selected from the group consisting of zinc ions, magnesium ions and silicates.

14. The method of claim 1, wherein said surfactant comprises an N-alkylpyrrolidone.

15. The method of claim 1, wherein said composition further includes a hydrotrope comprising an alkali metal salt of a linear $C_7$–$C_{13}$ carboxylic acid.

16. The method of claim 1, wherein the alkaline salt has a buffer capacity.

17. The method of claim 1, wherein the aqueous solution is capable of separation from an oil having a viscosity of from about 2 to about 10,000 cp at 25° C. such that the oil forms a distinct and substantially complete phase from the aqueous solution.

18. The method of claim 1, wherein there is substantially no aqueous phase drag out from the aqueous into the contaminant phase.

19. A method of cleaning metal substrates so as to remove contaminants therefrom comprising:

contacting said metal substrates with an aqueous cleaning solution comprising about 0.1–20 wt. % of an organic solvent-free cleaning composition containing at least one alkaline salt, a surfactant and an anticorrosion agent comprising a triazole compound and an alkali metal borate, said solution being characterized as having a phosphate content of less than 3 wt. % of the composition based on phosphorous, having complete phase separation ability whereby contaminants form a distinct and substantially complete phase from the aqueous solution, and having an initial foam height within the area bounded by points U, W, X and Z of FIG. 1, said contacting being for a sufficient time to remove said contaminants from said substrate and removing said substrate from said solution.

20. A method of cleaning metal substrates so as to remove contaminants therefrom comprising:

contacting said metal substrates with an aqueous cleaning solution comprising about 0.1–20 wt. % of an organic solvent-free cleaning composition containing at least one alkaline salt, a surfactant and an anticorrosion agent comprising a triazole compound and an alkali metal borate wherein the triazole compound comprises 1,2,3-benzotriazole; 4-phenyl-1,2,3-triazole; 1,2-naphthotriazole; 4-nitrobenzotriazole; 1,2,3-tolyltriazole; 4-methyl-1,2,3-triazole; 4-ethyl-1,2,3-triazole; 5-methyl-1,2,3-triazole; 5-ethyl-1,2,3 triazole; 5-propyl-1,2,3-triazole; or 5-butyl-1,2,3-triazole, said solution being characterized as having a phosphate content of less than 3 wt. % of the composition based on phosphorous, having complete phase separation ability whereby contaminants form a distinct and substantially complete phase from the aqueous solution, and having an initial foam height within the area bounded by points, U, W, X and Z of FIG. 1, said contacting being for a sufficient time to remove said contaminants from said substrate and removing said substrate from said solution.

21. A method of cleaning metal substrates so as to remove contaminants therefrom comprising:

contacting said metal substrates with an aqueous cleaning solution comprising about 0.1–20 wt. % of an organic solvent-free cleaning composition containing at least one alkaline salt, a surfactant, and an anticorrosion agent comprising a triazole compound and an alkali metal borate wherein the alkali metal borate comprises sodium tetraborate pentahydrate, sodium tetraborate decahydrate, or mixtures thereof, said solution being characterized as having a phosphate content of less than 3 wt. % of the composition based on phosphorous, having complete phase separation ability whereby contaminants form a distinct and substantially complete phase from the aqueous solution, and having an initial foam height within the area bounded by points U, W, X and Z of FIG. 1, said contacting being for a sufficient time to remove said contaminants from said substrate and removing said substrate from said solution.

* * * * *